US008818662B2

(12) United States Patent
Welschof et al.

(10) Patent No.: US 8,818,662 B2
(45) Date of Patent: Aug. 26, 2014

(54) DRIVE TRAIN OF A MOBILE VEHICLE

(75) Inventors: Bernward Welschof, Groβostheim (DE); Alfred Langen, Aschaffenburg (DE)

(73) Assignee: Linde Material Handling GmbH, Aschaffenburg (DE)

( * ) Notice: Subject to any disclaimer, the term of this patent is extended or adjusted under 35 U.S.C. 154(b) by 365 days.

(21) Appl. No.: 13/227,535

(22) Filed: Sep. 8, 2011

(65) Prior Publication Data

US 2012/0078486 A1 Mar. 29, 2012

(30) Foreign Application Priority Data

Sep. 28, 2010 (DE) ........................ 10 2010 046 725
Oct. 6, 2010 (DE) ........................ 10 2010 047 628

(51) Int. Cl.
*G06F 7/00* (2006.01)
*G06F 17/00* (2006.01)
*G06F 19/00* (2011.01)

(52) U.S. Cl.
USPC ................................ 701/54; 701/50; 123/492

(58) Field of Classification Search
USPC ..................... 701/102, 103, 104, 110, 54, 50; 123/681, 436, 682, 687, 480, 492, 493
See application file for complete search history.

(56) References Cited

U.S. PATENT DOCUMENTS 6,959,241 B2 * 10/2005 Itow et al. ..................... 701/102
7,664,586 B2 * 2/2010 Ozawa et al. ................... 701/50
7,774,117 B2 * 8/2010 Ozawa et al. ................... 701/54
8,175,790 B2 * 5/2012 Stemler et al. ................ 701/110
8,554,428 B2 * 10/2013 Hubbard et al. ................ 701/54

* cited by examiner

*Primary Examiner* — Thomas Moulis
*Assistant Examiner* — Joseph Dallo
(74) *Attorney, Agent, or Firm* — The Webb Law Firm

(57) ABSTRACT

This invention relates to a drive train (1) of a mobile vehicle with an internal combustion engine (2) and a load device (3) driven by the internal combustion engine (2). The internal combustion engine (2) is controlled by an electronic engine control unit (4) and the load device (3) is controlled by an electronic control unit (5). A low idle speed ($n_{uL}$) for the operation of the internal combustion engine at no load is stored in the engine control unit (4). The electronic control unit (5) detects a pause in the operation of the load device (3) and transmits a speed setpoint ($n_{Standby}$) for standby operation of the internal combustion engine to the engine control unit (4) to operate the internal combustion engine (2) at idle during a pause in operation at the speed setpoint ($n_{Standby}$), which is below the low idle speed ($n_{uL}$) for standby operation.

10 Claims, 3 Drawing Sheets

DRIVE TRAIN OF A MOBILE VEHICLE

CROSS REFERENCE TO RELATED APPLICATIONS

This application claims priority to German Application DE 10 2010 046 725.1, filed Sep. 28, 2010, and to German Application DE 10 2010 047 628.5, filed Oct. 6, 2010, both of which applications are herein incorporated by reference in their entireties.

BACKGROUND OF THE INVENTION

1. Field of the Invention

This invention relates to a drive train of a mobile vehicle, the mobile vehicle having an internal combustion engine and a load device driven by the internal combustion engine. The load device comprises at least one operating function of the vehicle. The internal combustion engine is controlled by an electronic engine control unit and the load device is controlled by an electronic control unit. A low idle speed for the operation of the internal combustion engine at idle is stored in the engine control unit of the internal combustion engine.

The invention further relates to a method for the operation of a drive train of a mobile vehicle, the vehicle having an internal combustion engine and a load device driven by the internal combustion engine. The load device comprises at least one operating function of the vehicle. The internal combustion engine is controlled by an electronic engine control unit and the load device is controlled by an electronic control unit. A low idle speed for the operation of the internal combustion engine at idle is stored in the engine control unit.

2. Description of Related Art

Mobile self-propelled machines, such as industrial trucks, agricultural machines, forestry machines, and construction machines, for example, excavators, wheeled loaders, telescopic loaders, tractors, combines, forage harvesters, sugar beet or potato diggers, have a drive train with an internal combustion engine that drives a load device with which at least one operating function of the machine can be performed.

Modern internal combustion engines have an electronic engine control unit with which the operation of the internal combustion engine is controlled. The engine control unit also defines a low idle speed for the idling of the internal combustion engine at which the internal combustion engine is operated when no torque is required of the internal combustion engine by an operating function. As a rule, the low idle speed is specified by the manufacturer of the internal combustion engine or is set by the user of the machine on the basis of a specified torque requirement when the machine is idling and under no load at a speed which is above the low idle speed to prevent the engine from stalling during a rapid transition from the no-load state and idle operation into load operation.

The internal combustion engine goes into idle operation at the low idle speed during pauses in operation during which no operating function of the load device is actuated and, therefore, the internal combustion engine is largely operating at no load. In idle operation, a specified quantity of fuel, which is also called the "idling mixture", is required for the operation of the internal combustion engine. On machines, pauses in operation of this type in which the internal combustion engine is operated under no load at idle at the low idle speed can account for a proportion in the range of 10-30% of the total time of operation of the machine. The fuel consumption of the internal combustion engine operating at no load in idle at the low idle speed therefore accounts for a significant portion of the total fuel consumption of the machine.

To reduce and eliminate fuel consumption during idle operation, the known art provides what is termed a start-stop function for the internal combustion engine, in which the internal combustion engine operating at no load is shut down during pauses in operation during which no operating function is actuated and is automatically restarted in response to a load request from an operating function. Start-stop functions are associated with a hybridization of the drive train, whereby the start of the internal combustion engine and the acceleration of the internal combustion engine can occur in a brief time span of less than 150 milliseconds (ms). For a start-stop function of this type as part of a hybridization, however, additional components are necessary in the drive train in the form of a flywheel engine or generator, a high-performance battery, a power control module in the form of power electronics and an electronic control system. A start-stop function of this type requires significant design and construction effort and results in significant extra costs.

The shutdown of the internal combustion engine operating at no load during pauses in operation can also result in increased wear on the internal combustion engine, in particular, in the vicinity of the crankshaft bearing system. The crankshaft bearing system experiences almost no wear as long as a rotational movement of the crankshaft is taking place. However, a frequent stopping and restarting of the internal combustion engine by a start-stop function can lead to increased wear.

It is an object of this invention to provide a drive train of the general type described above and a method for the operation of a drive train of this type, in which, with little design and construction effort, the fuel consumption of the internal combustion engine during pauses in operation of the machine can be reduced.

SUMMARY OF THE INVENTION

The invention teaches that the electronic control unit recognizes a pause in the operation of the load device during which no operating function is actuated and, during this pause in operation, the electronic control unit transmits a speed setpoint which is below the low idle speed for standby operation of the internal combustion engine to the engine control unit to operate the internal combustion engine under no load during a pause in operation at a speed setpoint for standby operation which is below the low idle speed. The invention teaches that the control unit which controls the load device detects a pause in operation during which no operating function of the machine is actuated and, during a pause in operation of this type a setpoint speed for standby operation of the internal combustion engine which is below the low idle speed is transmitted to the engine control unit. Because the engine control unit is generally provided with a speed control circuit for the internal combustion engine, during a pause in operation, the internal combustion engine under no load is operated at an idle speed which is below the previously defined low idle speed. As a result, a reduced fuel consumption of the internal combustion engine running at idle during the pause in operation can be achieved. On account of the transmission of a speed set point which is below the low idle speed from the control unit of the load device to the engine control unit, no additional mechanical, electrical, or electronic components are required to reduce the speed of the internal combustion engine running under no load during a pause in operation.

The reduction of the speed taught by the invention during a pause in operation can be easily achieved with little construction effort by a modification of the software of the engine control unit. The transmission of a speed setpoint for the reduced idle speed in standby operation from the control unit of the load device to the engine control unit also has the advantage that the reduction of the idle speed to the speed setpoint below the low idle speed occurs automatically during a pause in operation and only if the internal combustion engine is not under load and if the engine control unit is not demanding any additional power for an additional consumer, such as, an air-conditioning system, for example.

In one non-limiting embodiment of the invention, the electronic control unit is in communication on the input side with at least one position encoder which, when actuated, transmits an encoder signal for the operating function of the load device to the control unit, whereby the control device detects a pause in operation when there is no encoder signal. On mobile machines, an operating function is specified by the operator by means of a corresponding position encoder which is in functional communication with the control unit. Therefore, when in the position that the encoder is not actuated, the control unit can recognize a pause in operation during which no operating function is being actuated by an operator and can transmit the speed setpoint for standby operation at the reduced idle speed to the engine control unit.

In one embodiment of the invention, the control unit can or define recognize a pause in operation when there is no position encoder signal for specific period of time during which the position encoder is not actuated. As a criterion for the presence of a pause in operation, a period of non-actuation can be included in which the operator does not actuate the position encoder. It is thereby possible to distinguish a pause in operation from a brief interruption in operation, during which the position encoder is not actuated by the operator during an operating phase. As a result, it becomes possible to prevent the reduction of the idle speed to the value below the low idle speed during brief interruptions in operations in which a reduction of this type in the idle speed and the subsequent acceleration of the internal combustion engine would lead to delays in the sequence of operations and a reduction in the operating efficiency of the machine.

It is particularly advantageous if, during the operation of the internal combustion engine at the speed setpoint for standby operation, the control unit prevents the internal combustion engine from the imposition of a load by an operating function of the load device. Because the internal combustion engine outputs a reduced torque during the operating phase of the internal combustion engine in standby operation at the standby speed set point (which is below the low idle speed), the imposition of a load on the internal combustion engine by the control unit could result in a stalling of the internal combustion engine. If the imposition of a load on the internal combustion engine is prevented by the control unit during standby operation at the reduced idle speed, stalling of the internal combustion engine when an operating function is requested can be effectively prevented.

In one non-limiting development of the invention, it is particularly advantageous if, during the operation of the internal combustion engine at the speed setpoint for standby operation, when an encoder signal from the position encoder is transmitted to the control unit requesting an operating function of the load device, the control unit issues a required speed setpoint to the engine control unit for the operating function. The control unit inhibits the start of the operating function of the load device until the internal combustion engine reaches a specifiable minimum speed, such as the low idle speed. If the operator actuates the position encoder to initiate and perform an operating function after a pause in operation, the control unit transmits a corresponding speed setpoint to the engine control unit to make available the power of the internal combustion engine requested for the desired operating function. Preferably, in this case, the internal combustion engine accelerates at maximum torque from the reduced idle speed of standby operation to the requested speed. During the acceleration of the internal combustion engine, the control unit inhibits the start of the operating function and, thus, the imposition of a load on the internal combustion engine until the internal combustion engine has reached and exceeded a minimum speed, for example, the low idle speed. During the acceleration of the internal combustion engine from the reduced idle speed of standby operation after a pause in operation, the control unit therefore permits the imposition of a load on the internal combustion engine again only if the internal combustion engine has reached a specified minimum speed, preferably, the normal low idle speed. As a result, stalling of the internal combustion engine in the event of a load request from an operating function initiated after a pause in operation during acceleration from standby operation at the reduced idle speed can be effectively prevented.

For this purpose, the control unit is advantageously in functional communication with a speed sensor device which measures the current speed of the internal combustion engine. With a speed sensor device of this type, after a pause in operation, the control device can easily electronically inhibit the start of an operating function requested by the operator and, therefore, the imposition of a load on the internal combustion engine until the internal combustion engine, during acceleration from the reduced idle speed of standby operation, has reached the minimum speed.

In one embodiment of the drive train of the invention, the load device is in the form of a transmission device. The transmission device can thereby be a traction drive of the machine and, for example, can be a mechanical transmission or a torque division transmission.

In one preferred embodiment of the invention, the load device is a hydrostatic drive system with a hydrostatic traction drive and/or a hydraulic work system with at least one hydraulic consumer.

However, the invention can also include or be practiced with a load device that comprises an electrical consumer, for example, an electric generator of an electric traction drive of the machine driven by the internal combustion engine.

It is particularly advantageous if the operating function of the load device, in particular, the hydrostatic drive and/or the consumer of the hydraulic work system, can be actuated electrically or electro-hydraulically, and is in functional communication with the control unit for actuation. With electric or electro-hydraulic actuation, the operating function of the traction drive or the operating functions of the hydraulic operating system of the load device can easily be inhibited by the control unit during the acceleration of the internal combustion engine from the reduced idle speed of standby operation until the minimum speed of the internal combustion engine has been reached. With an electrical or electro-hydraulic actuation of the operating function of the load device, the control unit can therefore easily control the initiation of movement of the required operating function after a pause in operation and the operation of the internal combustion engine at the reduced idle speed for standby operation as a function of the speed of the internal combustion engine.

It is particularly advantageous if, as in one advantageous development of the invention, an equalization element is located in the drive train to equalize the irregularities of the speed in standby operation of the internal combustion engine. With an equalization element of this type in the drive train, it is easily possible to equalize any irregularities in the speed of the internal combustion engine, which increases at the reduced idle speed for standby operation.

With regard to the method for the operation of the drive train of the invention, the object of the invention set forth above is accomplished in that, to reduce the fuel consumption of the internal combustion engine under no load at idle, the internal combustion engine under no load is operated at a speed for standby operation that is below the low idle speed stored in the engine control unit. In the method of the invention, the speed of the unloaded internal combustion engine of the drive train is reduced to a standby speed which is below the low idle speed stored in the engine control unit. As a result of this reduction of the idle speed, the fuel consumption of the internal combustion engine running at no load can be significantly reduced during a pause in operation of the machine.

The reduction of the speed to the standby speed below the low idle speed during a pause in operation of the machine can be achieved without complex or expensive additional components and, therefore, with little design or construction effort if, during a pause in operation of the load device during which no operating function is actuated, the electronic control unit transmits a speed setpoint which is below the low idle speed to the engine control unit for standby operation of the internal combustion engine. By means of the control unit that controls the load device and the operating functions, a pause in the operation of the machine can be easily detected. As a result of the transmission to the engine control unit of a speed setpoint for standby operation of the internal combustion engine, the speed reduction and regulation of the speed of the internal combustion engine in standby operation can easily be performed by the engine control unit.

If, as in one preferred development of the invention, after the request for an operating function has been made by actuating a position encoder which actuates the operating function, a speed necessary for the achievement of the operating function is initiated by the control unit to the engine control unit, the internal combustion engine is accelerated at maximum torque to the speed requested by the control unit and the performance of the operating function is inhibited by the control unit until the internal combustion engine, during acceleration from standby operation, has reached a minimum speed, for example, the low idle speed, it is easily possible to prevent a stalling of the internal combustion engine during acceleration from standby operation. With the control unit, the initiation of the requested operation and the performance of the operating function of the load device can be easily controlled as a function of the speed of the internal combustion engine, and can be electronically inhibited until the internal combustion engine has accelerated from standby operation to a specified minimum speed.

Additional advantages and details of the invention are explained in greater detail below with reference to the exemplary embodiments illustrated in the accompanying schematic figures.

DESCRIPTION OF THE PREFERRED EMBODIMENTS

Figure 1:
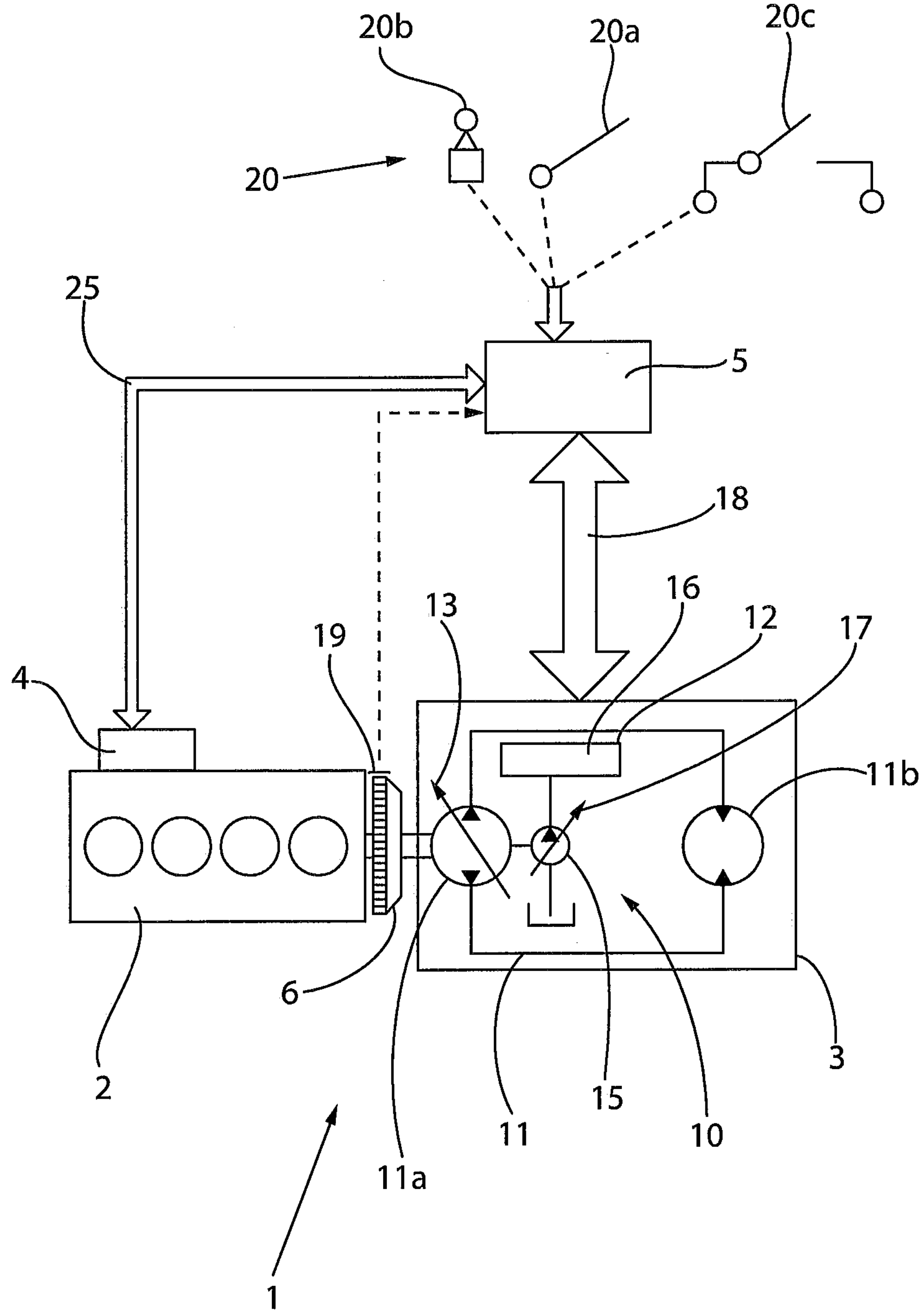
FIG. 1 is a schematic illustration of a drive train of the invention.

FIG. 1 is a schematic diagram of a drive train 1 of the invention of a mobile machine (which is not illustrated in any further detail), such as an industrial truck or a construction or agricultural machine, for example.

The drive train 1 has an internal combustion engine 2 and a load device 3 driven by the internal combustion engine 2, for example, a driven consumer. The load device 3 performs the operating functions of the machine, for example, on an industrial truck a traction drive and a hydraulic work system for the actuation of a load holding means on a lifting mast, or on a construction machine in the form of an excavator, for example, the load device 3 can be the traction drive and the operating functions of the equipment in the form of a shovel.

The internal combustion engine 2 is provided with an electronic engine control unit 4 which controls the internal combustion engine 2. The load device 3 is controlled by an electronic control unit 5, for example, a higher level vehicle control unit.

The engine control unit 4 has a speed control circuit and operates the internal combustion engine 2 at an idle speed $n_{uL}$ which is stored in the engine control unit 4 when it is not under any load, i.e., when the operating functions performed by the load device 3 are not actuated and, therefore, no useful power is required by the load device 3.

In the illustrated exemplary embodiment, the load device 3 includes a hydrostatic drive system or a hydrostatic transmission 10 which comprises a hydrostatic traction drive 11 and/or a hydraulic operating system 12 as operating functions of the machine. The traction drive 11 has a variable displacement pump 11*a* which is connected so that it is driven by a driveshaft of the combustion engine 2, and one or more fixed or variable displacement hydraulic motors 11*b*, which are connected via a closed circuit to the pump 11*a* and are functionally connected in a manner not illustrated in any further detail with the driven wheels of the machine. The displacement of the pump 11*a* can be set by means of an actuator device 13, which can be actuated electrically or a electro-hydraulically, and is functionally connected with the control unit 5 (as indicated by a double arrow 18) for its actuation.

In the illustrated exemplary embodiment, the hydraulic operating system 12 comprises one or more pumps 15 operated in an open circuit which are connected so that they are driven by a driveshaft of the internal combustion engine 2. On the input side, the pump 15 is in communication with a reservoir and delivers to a control valve device 16, by means of which the hydraulic consumers of the hydraulic operating system 12, which are not illustrated in a further detail, can be controlled. The control valve device 16 preferably comprises one or more directional control valves for the actuation of the consumers. The control valves in the form of directional control valves of the control valve device 16 can be actuated electrically or electro-hydraulically and are functionally connected with the control unit 5 for actuation as indicated by the double arrow 18. The pump 15 of the hydraulic work system can be in the form of a constant displacement pump or in the form of a variable displacement pump. If the pump is in the form of a variable displacement pump 15, an electric or electro-hydraulically actuated actuator device 17 is functionally connected with the control unit 5 for actuation, as indicated by the double arrow 18.

On the input side, the control unit 5 is in functional communication with at least one position encoder 20 by means of which an operator can control the operating functions of the load device 3. In the illustrated exemplary embodiment, an acceleration pedal and/or a brake pedal 20*a* is provided as the position encoder for the control of the operating function formed by the traction drive 11. The accelerator and/or brake pedal 20*a* is in a functional connection on the input side with the control unit 5 and when activated transmits an electrical encoder signal to the control unit 5. To control the operating function of the hydraulic work system 12, at least one position encoder in the form of a joystick 20*b* is provided which, when actuated, transmits an electrical encoder signal to the control unit 5. Additional position encoders 20*c* can also be provided, for example, but not limited to, a seat switch, a direction of travel switch, or a type of operation selection switch, which is also called a mode switch, which when actuated transmits a corresponding encoder signal to the control unit 5.

The drive train 1 of the invention further comprises a flywheel 6 on the driveshaft of the internal combustion engine 2.

The control unit 5 is in a functional connection on the input side with a speed sensor device 19 for the determination of the current speed of the internal combustion engine.

The control unit 5 in the form of a vehicle control unit is also in functional communication by means of a connection 25 (illustrated by the double arrow) with the engine control unit 4 of the internal combustion engine 2.

When an operating function is actuated by the corresponding actuation of a position encoder 20 by the operator, the control unit 5 in turn actuates the load device 3, for example, the actuator of the pump 11*a* of the traction drive 11 and/or the directional control valves of the control valve device 16 of the hydraulic work system 12 as appropriate to the desired operating function, and then via the connection 25 transmits a speed setpoint to the engine control unit 4, so that the internal combustion engine 2 makes available the required speed and/or power for the operating function requested by the operator via the actuated position encoder 20.

The invention teaches that during a pause in operation of the machine, the control unit 5 outputs a speed setpoint $n_{Standby}$ for standby operation which is below the low idle speed $n_{uL}$ via the connection 25 to the engine control unit 4. A pause in operation is hereby defined as a period of time or an operating phase of the machine during which the operator does not request any operating function by actuating the position encoder 20. The control unit 5 can easily detect a pause in operation by means of the electrical encoder signals from the position encoder 20. An additional criterion that can be taken into consideration by the control unit 5 to identify a pause in operation can be a period of non-actuation, i.e., a length of time during which the position encoder 20 is not actuated although standby operation has not yet been activated. The non-activation period is preferably in the range of a few seconds, for example 5 seconds to one minute. The non-actuation period is defined as a function of the current conditions in which the machine is being operated and can be adjusted as necessary.

In response to the output of the speed setpoint $n_{Standby}$ for standby operation from the control unit 5 to the engine control unit 4, the internal combustion engine 2 is operated at the reduced speed $n_{Standby}$ during a pause in operation of the machine when the engine is not under load instead of at the low idle speed $n_{uL}$ which is stored in the engine control unit 4.

If a position encoder 20 is actuated by the operator during this standby operation of the internal combustion engine 2 at the reduced speed $n_{Standby}$ to initiate an operating function of the load device 3, the control unit 5 transmits a speed setpoint required for the requested operating function via the connection 25 to the engine control unit 4, to make available the power and torque from the internal combustion engine 2 necessary for the requested operating function. The internal combustion engine 2 thereby accelerates from standby operation at the standby speed $n_{Standby}$ to the speed requested by the control unit 5 with the maximum torque. The control unit 5, by means of the speed sensor device 19, measures the current speed of the internal combustion engine 2 during the acceleration to the desired speed and blocks the encoder signal from the actuated position encoder 20 for the load device 3 until the internal combustion engine 2 has reached a minimum speed, for example, the low idle speed $n_{uL}$. After the engine has reached and exceeded the minimum speed, the control unit 5 controls the load device 3 according to the encoder signal from the actuated position encoder 20 via a connection 18 to perform the desired operating function. The minimum speed can be specified and changed.

The control unit 5 thereby prevents the imposition of a load on the internal combustion engine 2 during a pause in operation in which the internal combustion engine 2 is operated in standby at the reduced speed $n_{Standby}$ and thus below the low idle speed $n_{uL}$. After the actuation of a position encoder 20 by the operator following a pause in operation, the control unit 5 only permits the imposition of a load on of the internal combustion engine 2 by the load device 3 when the internal combustion engine 2 has reached the minimum speed. The performance of the operating function is thus easily and electronically inhibited by the control unit 5 via the connection 18 until the internal combustion engine 2 has reached the specified or set minimum speed.

On account of the electrical or electro-hydraulic actuation by the control unit 5 of the load device 3, for example, of the actuator device 13 of the traction pump 11*a* and/or of the directional control valves of the control valve device 16 and, optionally, of the actuator device 17 of the operating pump 15, the performance and thus the initiation of movement of the operating function requested by the operator can be easily controlled by the control unit 5 as a function of the speed of the internal combustion engine 2 during acceleration from the standby speed $n_{Standby}$.

Figure 2:
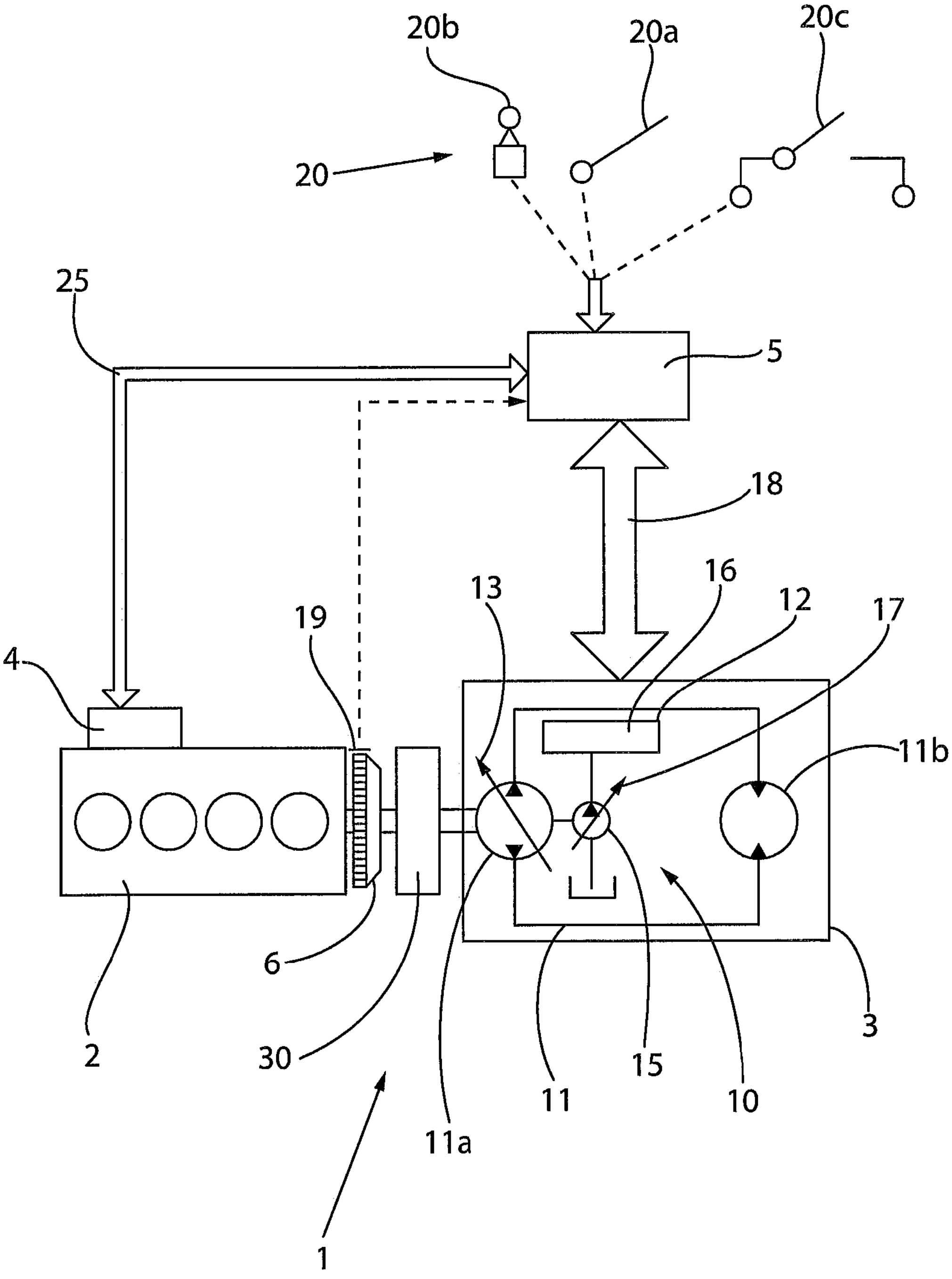
FIG. 2 is a development of the drive train illustrated in FIG. 1.

FIG. 2 shows a development of the drive train 1 of the invention. Components that are identical to the components shown in FIG. 1 are identified by the same reference numbers.

In the development of the drive train 1 of the invention illustrated in FIG. 2, there is also an equalization element 30 in the drive train 1, which is in functional communication with the output shaft of the internal combustion engine 2. The equalization element 30 is located both physically and functionally between the flywheel 6 and the consumer formed by the load device 3. The equalization element 30, which can be in the form of a damping element or torsional vibration damper, for example, is used to equalize any irregularities in the speed of the internal combustion engine 2 speed in standby operation at the reduced speed $n_{Standby}$. The equalization element 30 is tuned to the reduced speed $n_{Standby}$ in idle operation of the internal combustion engine 2 during a pause in operations to equalize any irregularities of the rotational movement of the output shaft of the internal combustion engine 2 at the reduced standby speed $n_{Standby}$.

Figure 3:
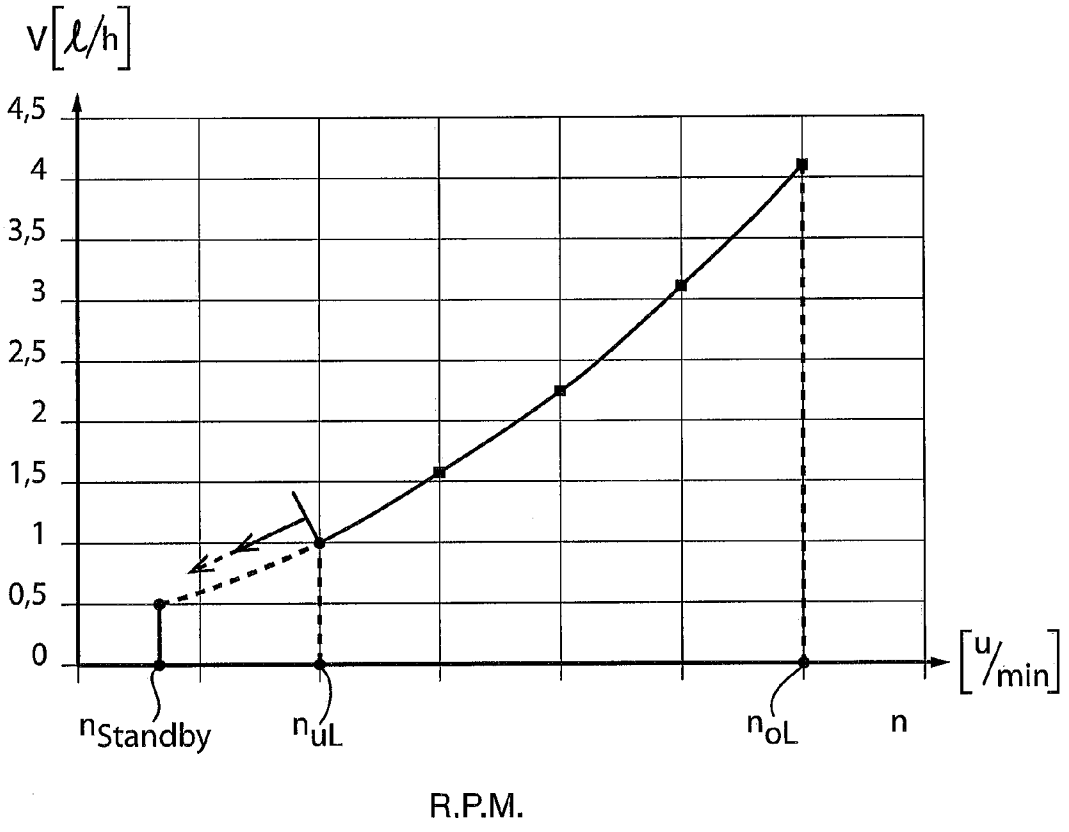
FIG. 3 is a diagram of fuel consumption at idle of the internal combustion engine of a drive train of the invention.

FIG. 3 is a diagram of the fuel consumption at idle of the internal combustion engine at no load, whereby the speed n of the internal combustion engine 2 in revolutions per minute (rpm) is plotted on the abscissa and the fuel consumption V of the internal combustion engine 2 in liters per hour (l/h) is plotted on the ordinate.

The diagram shows the low idle speed $n_{uL}$ which is stored in the engine control unit 4 and the upper idle speed $n_{oL}$ which represents the upper regulated speed of the internal combustion engine in idle at no load.

The diagram in FIG. 3 also shows the speed setpoint $n_{Standby}$ transmitted by the control unit 5 to the engine control unit 4 which is below the low idle speed for standby operation of the internal combustion engine 2 during a pause in the operation of the machine. The fuel consumption V of the internal combustion engine 2 during a pause in operation and, thus, the idle consumption of the internal combustion engine 2 can be significantly reduced as a result of the reduction of the speed of the internal combustion engine 2 during a pause in operation from the low idle speed $n_{uL}$ to the reduced speed $n_{Standby}$ of standby operation. With the invention, the reduction of fuel consumption V of the internal combustion engine 2 in idle operation can be achieved easily by reducing the idle speed n without additional mechanical, electrical, or electronic components by modifying the software of the engine control unit 4 to specify the reduced speed setpoint $n_{Standby}$ for the low idle via the control unit 5.

The invention is not limited to the mobile, self-propelled machines described above. The invention can also be used in motor vehicles and utility vehicles, such as trucks, or buses, for example.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A drive train of a mobile vehicle, comprising:

an internal combustion engine; and a load device driven by the internal combustion engine and defining at least one operating function of the machine;

wherein the internal combustion engine is controlled by an electronic engine control unit and the load device is controlled by an electronic control unit, wherein a low idle speed for operation of an unloaded internal combustion engine is stored in the engine control unit of the internal combustion engine, wherein the electronic control unit recognizes a pause in the operation of the load device during which no operating function is activated, and during the pause in operation the electronic control unit transmits a speed setpoint ($n_{Standby}$) for standby operation of the internal combustion which is below the low idle speed ($n_{uL}$) to the engine control unit to operate the internal combustion engine at no load during a pause in operation at the speed setpoint ($n_{Standby}$) which is below the low idle speed ($n_{uL}$) for standby operation, wherein the electronic control unit is in communication on an input side with at least one position encoder which, when an operating function is activated, emits an encoder signal for the operating function of the load device to the control unit, whereby the control unit recognizes a pause in operation when there is no encoder signal, and wherein during the operation of the internal combustion engine at the speed setpoint ($n_{Standby}$) for standby operation and when an encoder signal from the position encoder is transmitted to the control unit for an operating function of the load device, the control unit transmits a required speed setpoint to the engine control unit for the operating function, wherein the control unit inhibits the start of the operating function of the load device until the internal combustion engine reaches low idle speed ($n_{uL}$).

2. The drive train of claim 1, wherein the control unit recognizes a pause in operation as a period in which there is no encoder signal and after the position encoder has not been actuated for a specifiable length of time.

3. The drive train of claim 1, wherein during operation of the internal combustion engine at the speed setpoint ($n_{Standby}$) for standby operation, the control unit prevents the application of a load to the internal combustion engine by an operating function of the load device.

4. The drive train of claim 1, wherein the control unit is in functional communication with a speed sensor device to capture an actual speed value of the internal combustion engine.

5. The drive train of claim 1, wherein the load device is a transmission device.

6. The drive train of claim 1, wherein the load device is a hydrostatic drive system with at least one of a hydrostatic traction drive and a hydraulic operating system with at least one hydraulic consumer.

7. The drive train of claim 1, wherein the operation function of at least one of the hydrostatic traction drive and of the consumers of the hydraulic work system is actuated electrically or electro-hydraulically and for actuation are in functional communication with the control unit.

8. The drive train of claim 1, wherein an equalization element is located in the drive train to equalize speed irregularities during standby operation of the internal combustion engine.

9. A method for the operation of a drive train of a mobile vehicle with an internal combustion engine and a load device driven by the internal combustion engine which defines at least one operating function of the machine, comprising:

controlling the internal combustion engine by an electronic engine control unit; and controlling the load device by an electronic control unit, wherein a low idle speed for the operation of the unloaded internal combustion engine is stored in the engine control unit of the internal combustion engine, wherein for the reduction of the fuel consumption at idle of the internal combustion engine operating at no load, the internal combustion engine operating at no load is operated at a speed ($n_{Standby}$) for standby operation that is below the low idle speed ($n_{uL}$) stored in the engine control unit, wherein in accordance with the request for an operating function by an actuation of position encoder that actuates the operating function, a speed required for the performance of the operating function is transmitted from the control unit to the engine control unit, the internal combustion engine is accelerated at maximum torque to the speed requested by the control unit and the control unit inhibits the execution of the operating function until the internal combustion engine, during acceleration from standby operation, has reached the low idle speed ($n_{uL}$).

10. The method of claim 9, wherein during a pause in the operation of the load device in which no operating function is actuated, a speed setpoint ($n_{Standby}$) for standby operation of the internal combustion engine which is below the low idle speed ($n_{uL}$) is transmitted from the electronic control unit to the engine control unit.

* * * * *